Nov. 8, 1955

H. W. VOGL 2,722,870

MACHINE FOR MANUFACTURING PARCEL
CARRIERS HAVING LOOPED HANDLES

Filed Feb. 18, 1950

Inventor
Hugh W. Vogl
By John F. Brezina
Attorney

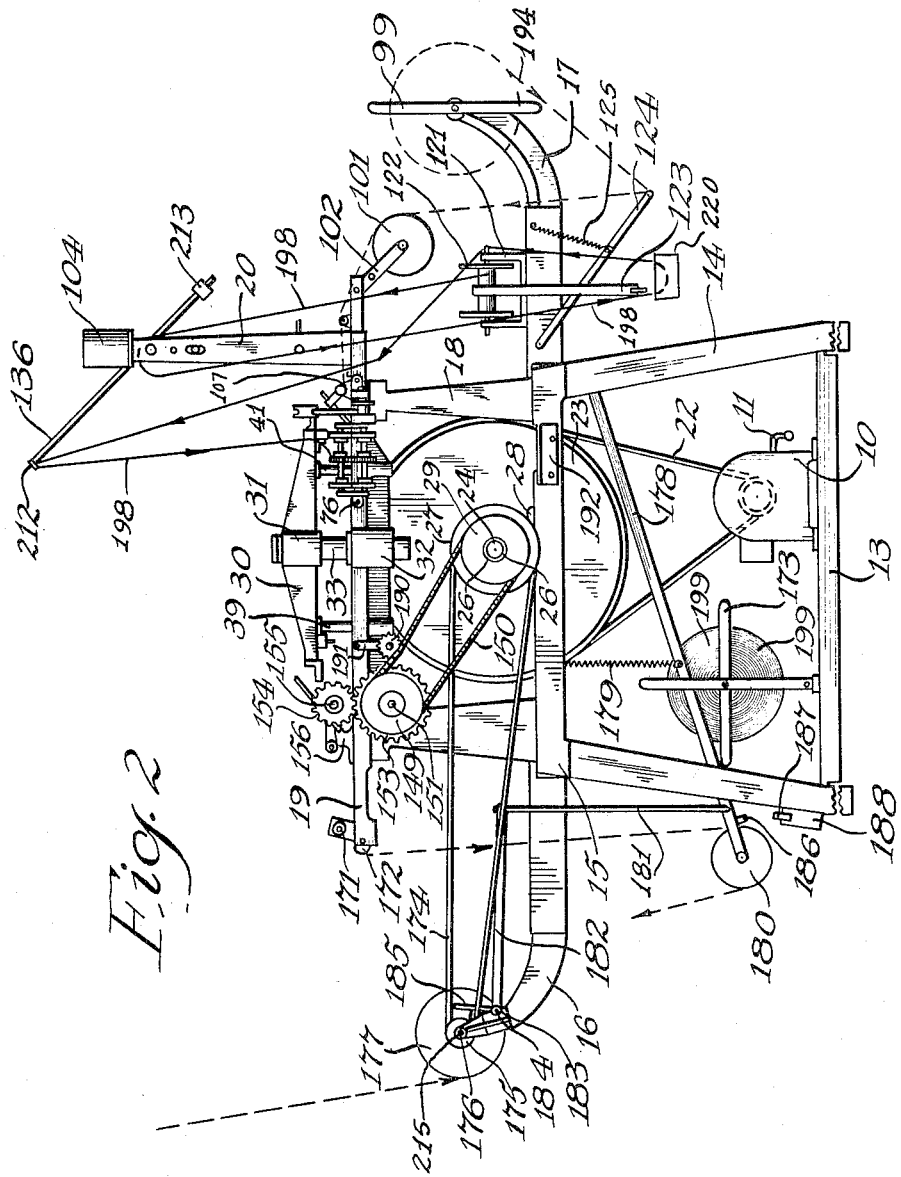

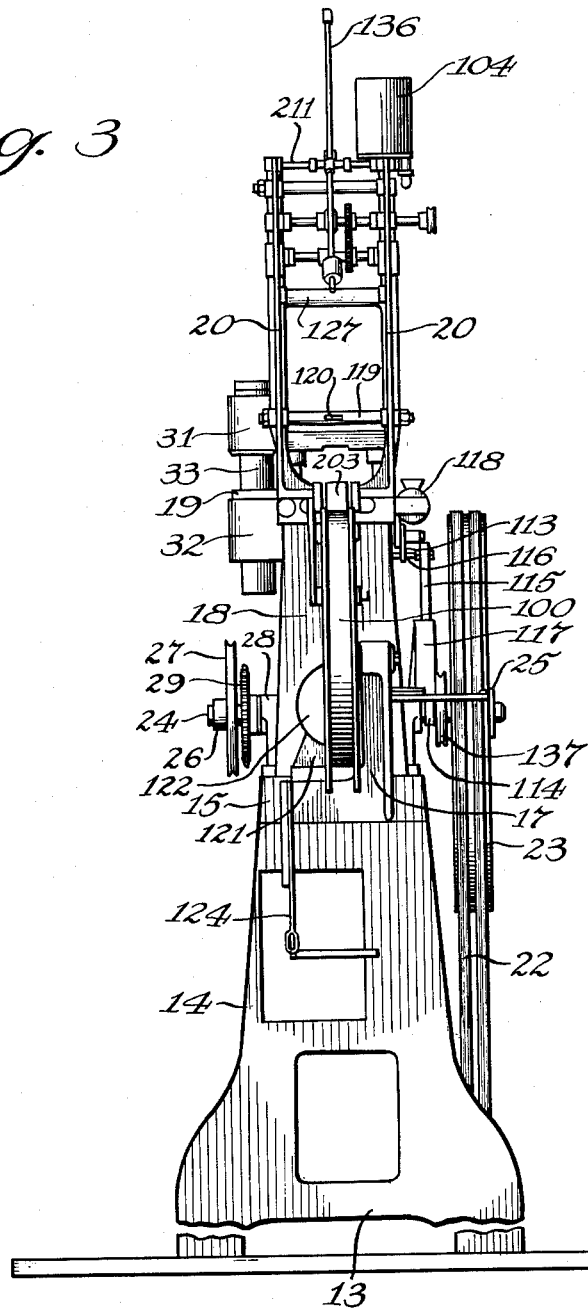

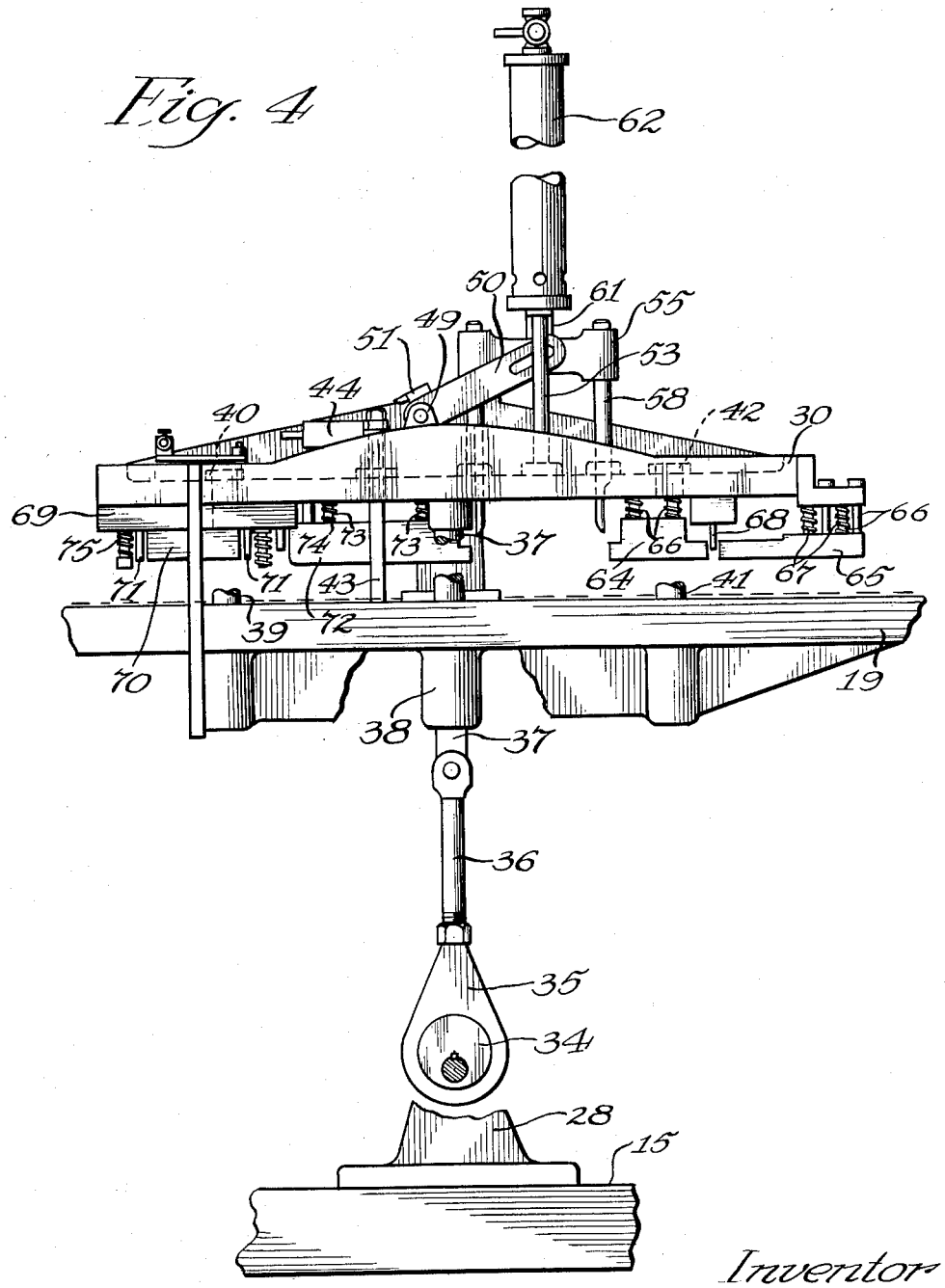

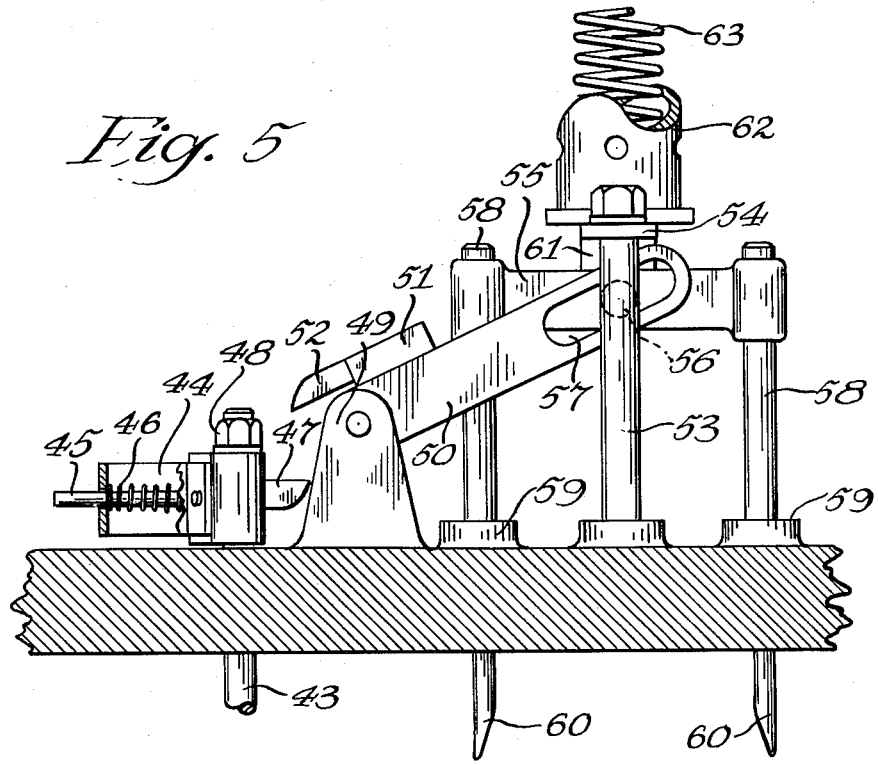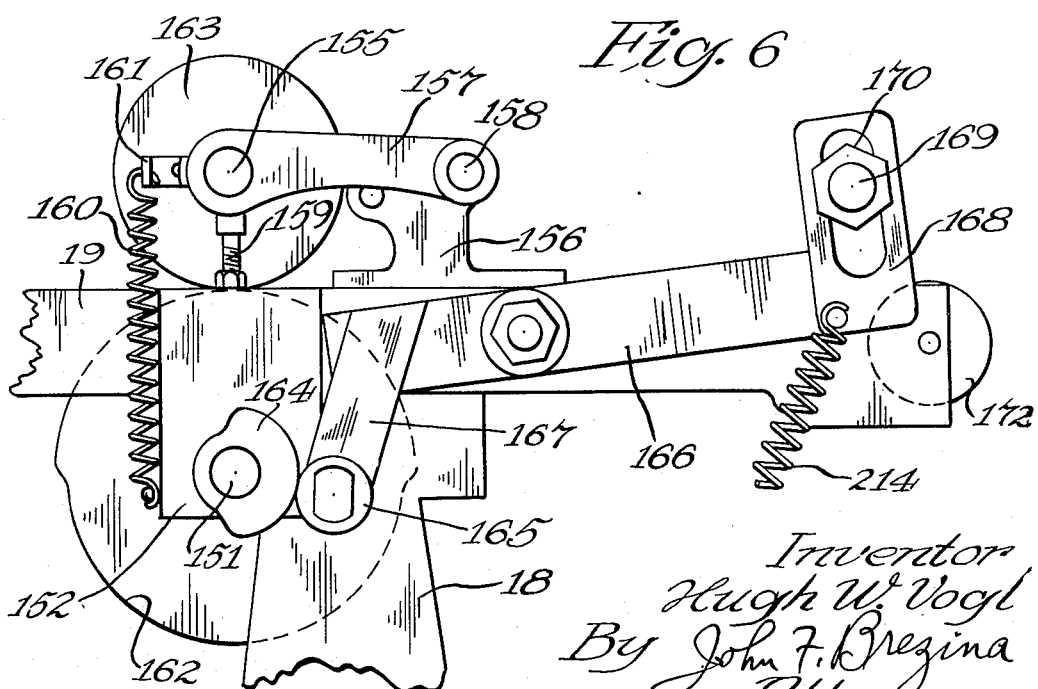

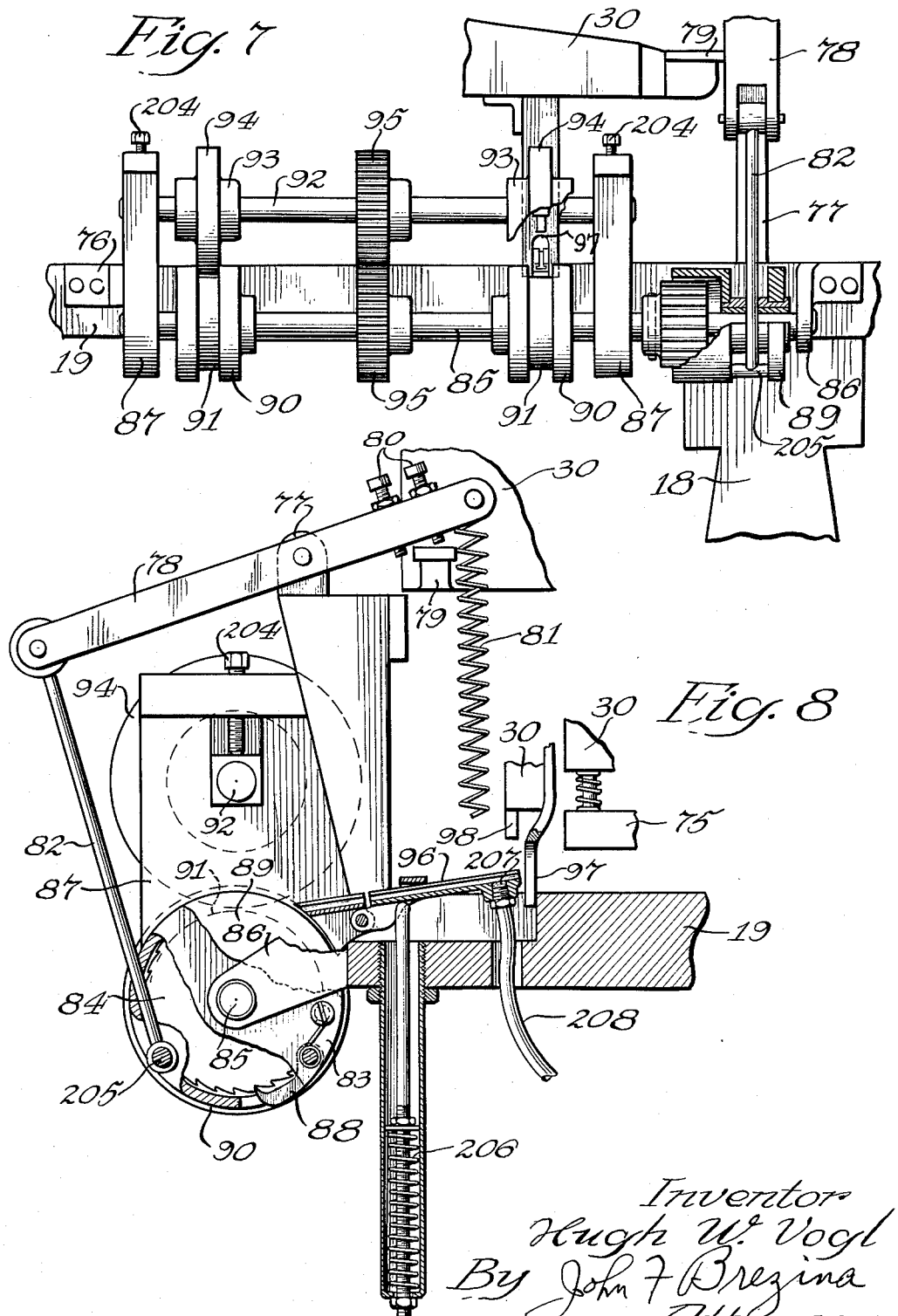

Nov. 8, 1955
H. W. VOGL
2,722,870
MACHINE FOR MANUFACTURING PARCEL
CARRIERS HAVING LOOPED HANDLES
Filed Feb. 18, 1950
9 Sheets—Sheet 7
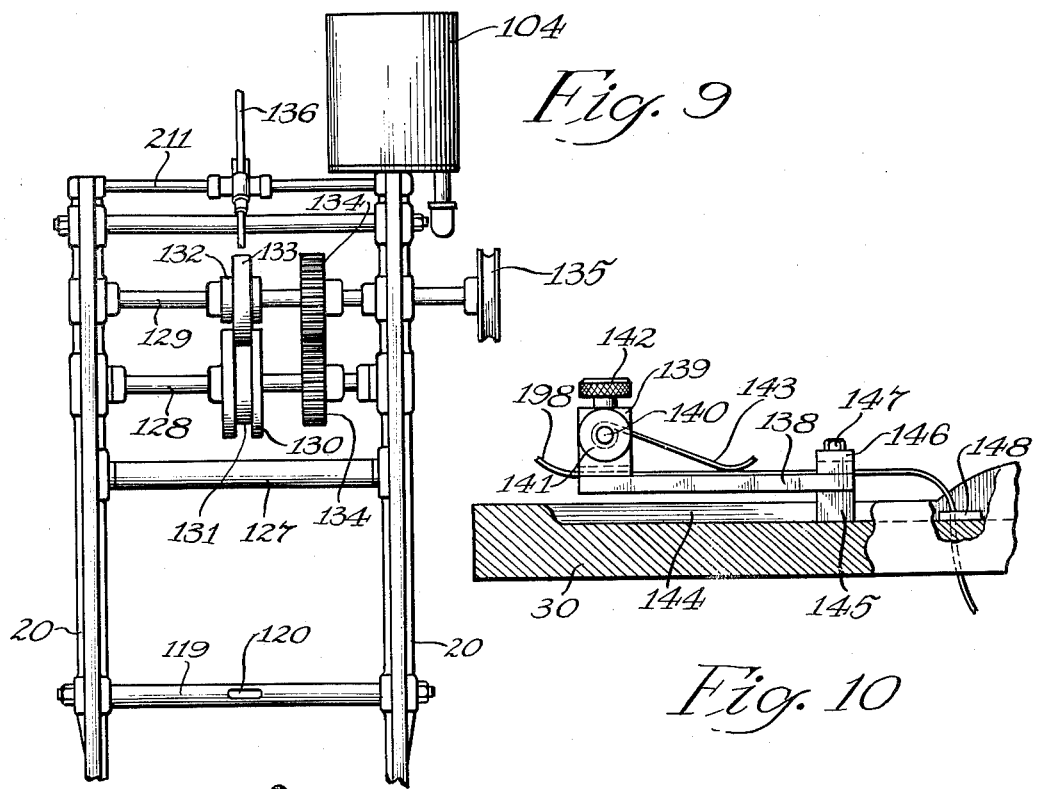
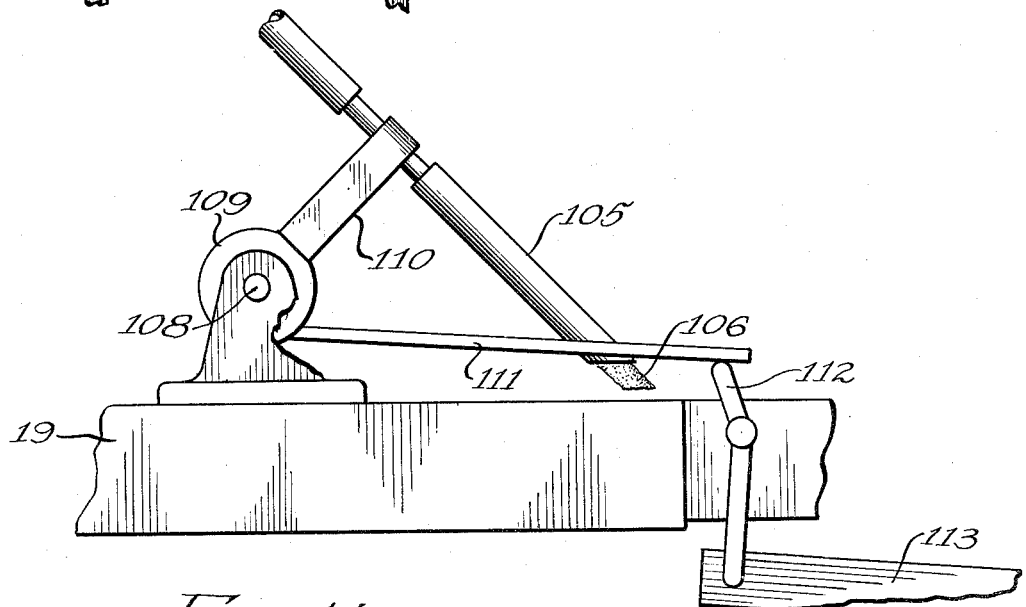
Inventor
Hugh W. Vogl
By John F. Brzina
Attorney

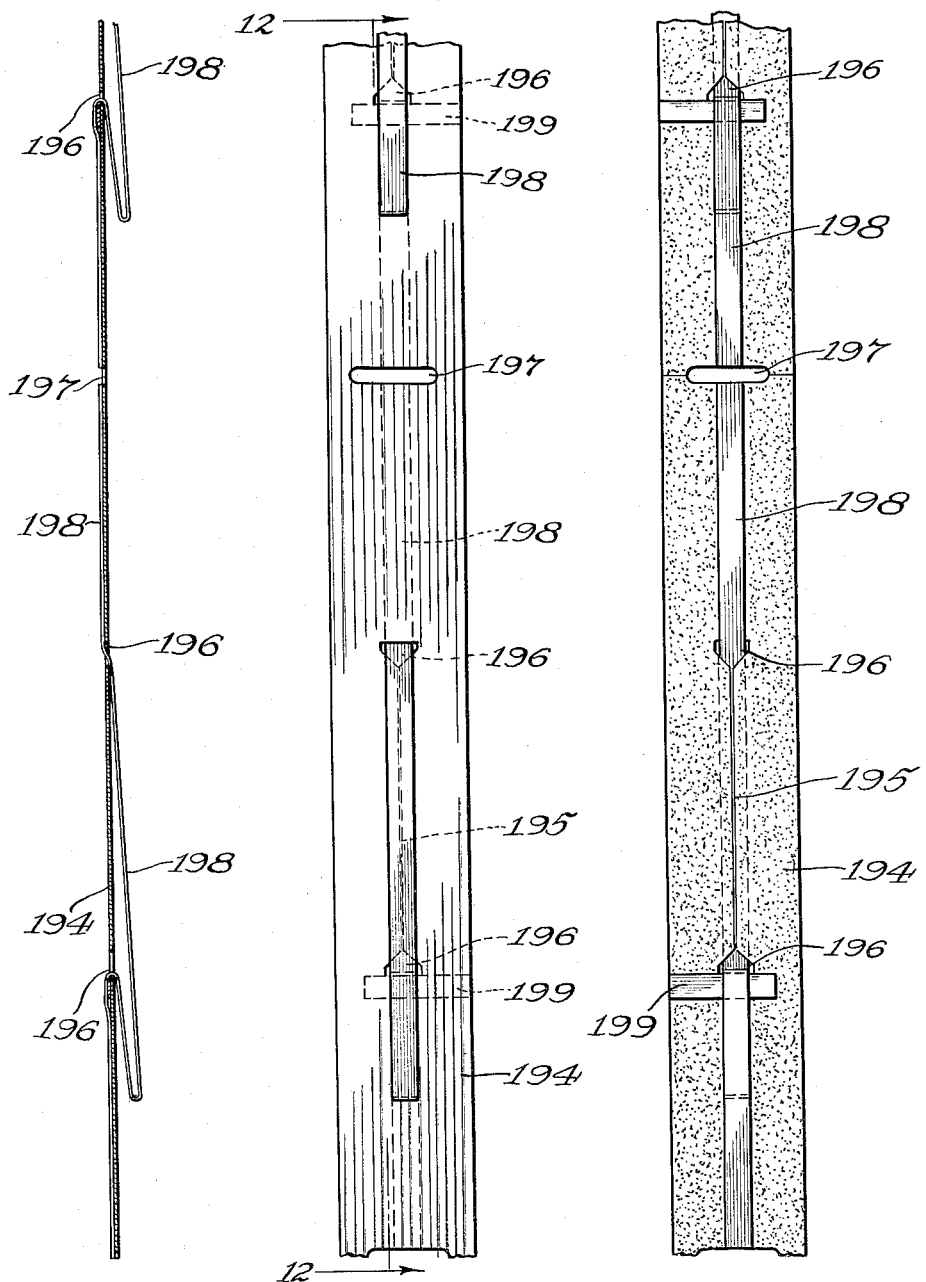

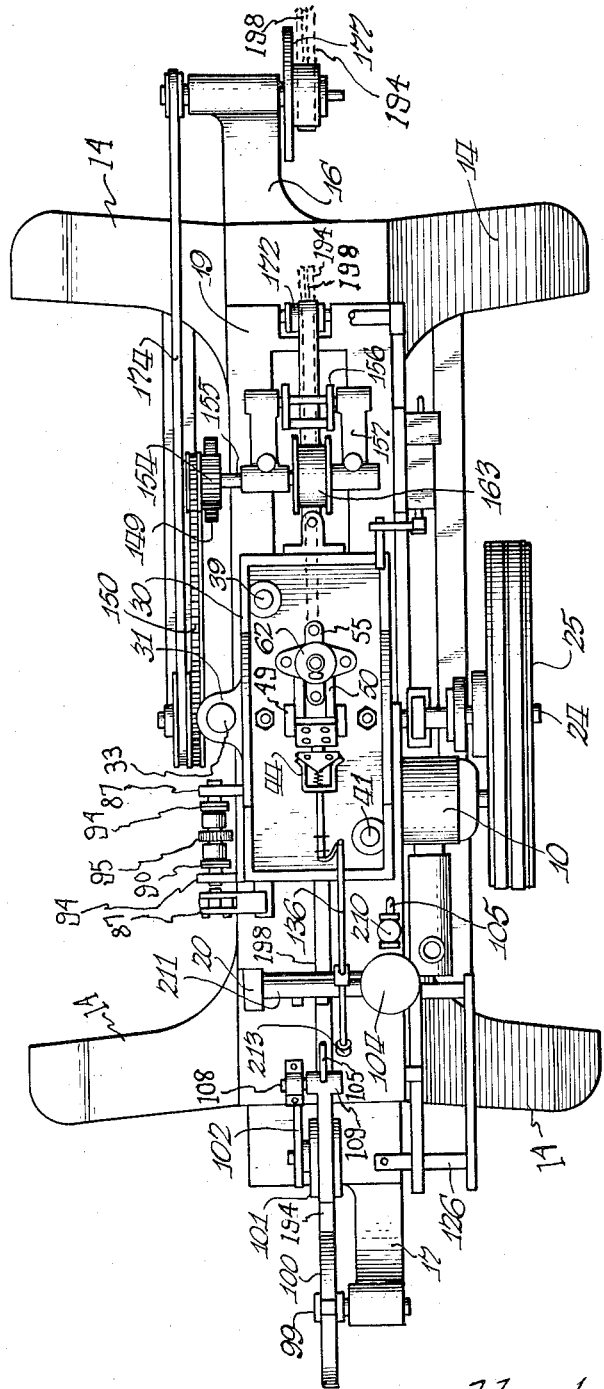

United States Patent Office 2,722,870
Patented Nov. 8, 1955

2,722,870

MACHINE FOR MANUFACTURING PARCEL CARRIERS HAVING LOOPED HANDLES

Hugh W. Vogl, Wilmette, Ill.

Application February 18, 1950, Serial No. 144,942

12 Claims. (Cl. 93—1)

My novel invention relates to a machine which is adapted to continuously and connectedly manufacture parcel carriers having looped handles. My novel device is especially adapted for continuously affixing carrying cords of a suitable ribbon or the like to an anchoring member or strip having a gummed surface on one side of said strip.

For many years I have been carrying on the manufacture of carrying members of the kind described herein, and I have encountered numerous difficulties and shortcomings which have arisen as a result of a necessity of continuously moving into the operation of a plurality of various elongated elements which are to be assembled to cooperate in the finished parcel carrier.

My company has been carrying on the manufacture of parcel carriers, which are hereinafter described, for many years and according to the device which is the subject matter of the Oscar Kind United States Patent No. 2,095,139 and in which my company has an interest.

Some of the difficulties encountered, in the main, resulted by virtue of the necessity of intermittently stopping the conveyor along which the assembling was occurring while at the same time continuously moving elements into the device.

Another difficulty which resulted because of the use of the device illustrated in the Kind patent for manufacturing the aforesaid parcel carrying members was that occasionally the continuously assembled parcel carrier would break with a subsequent jamming-up of elements into the former machines. In order to preclude such jamming-up it became necessary to provide elements which would cause the operation to cease as soon as the break occurred.

Additionally, I have overcome numerous difficulties encountered in the prior method of manufacture by providing a novel mechanism for intermittently drawing the anchoring strip through my novel device and having same cooperate with a group of elements adapted to intermittently retain the parcel carrier when it becomes necessary to perform operations in a fixed position. It will better be appreciated wherein one of the difficulties of the prior machines resides when it is realized that in order to dry the gummed surfaces so that proper adhesion results between the various elements of the parcel carrier, it is necessary to carry the finished parcel carrier through a very long path at the end of which the parcel carriers are continuously rolled in rolls. The necessity of an exceedingly long path results in the need for stopping operations at a critical point to preclude inconvenience and impeded manufacture because the stopping of the operation at a point distant from the pull required to draw the strips through the machines would not result in the stopping of the parcel carrier being drawn through the machine because the two phenomena could not be accomplished simultaneously because of the distance. I have therefore provided a means for continuously rolling the finished product into rolls while intermittently halting the parcel carrier in its process of assembling.

In the assembling of parcel carriers, it is necessary that the various gummed strips be made wet in appropriate positions so that the various elements may be properly connected. I have provided in combination with my novel device a unique mechanism for stopping the gravity flow of water when the operation of my device is stopped to thereby stop the continuous flow of water and preclude consequent flooding.

Under various conditions of use of the parcel carrier various lengths of handles may be desired. In combination with the unique elements of my device, I have provided a novel mechanism for adjusting the length of the ultimate carrying loop or cord of the parcel carrier.

I wish it to be understood that operating machines, such as those illustrated in the Kind United States Patent No. 2,095,139, has demonstrated to me that for efficient mass production numerous improvements had to be developed and perfected. Through continuous experiment, I have been able to make novel improvements which are incorporated as part hereof.

Other and further objects of my invention will become apparent from the following description and appended claims, reference being had to the accompanying drawings and numerals of reference thereon.

On the drawings:

Fig. 2 is a rear elevation of my device.

Fig. 3 is a side elevation looking at the left side of Fig. 1.

Fig. 4 is a detailed view looking at the front of the reciprocating head and cutting dies and associated adjacent cooperating elements.

Fig. 5 is an enlarged detailed view of the mechanism used for pushing the carrying cord through the anchoring strip and looking at the device from the front.

Fig. 6 is an enlarged detailed view of the mechanism for intermittently drawing the parcel carrier through the device and looking at the front of the device.

Fig. 7 is an enlarged detailed view of the mechanism for intermittently feeding the reinforcing tape into the device and looking at same from the back.

Fig. 8 is an enlarged detailed view, looking at the right-hand side of Fig. 7, parts being broken away for the purpose of illustration.

Fig. 9 is a detailed view of the anchoring tape guiding mechanism and looking at same from the left-hand side of Fig. 1.

Fig. 10 is a detailed view of the carrying ribbon guide and track and looking at same from the front.

Fig. 11 is an enlarged detailed view of the mechanism for intermittently applying water to the anchoring tape and looking at same from the front.

Fig. 12 is a side elevation of a segment of parcel carrying mechanism.

Fig. 13 is a top plan view of Fig. 12.

Fig. 14 is a bottom plan view of Fig. 13.

Fig. 15 is a top plan view of my machine, and showing parts of the tape broken away, and with the reels and mounting thereof (which are at right of Fig. 1) broken away.

Figure 1:
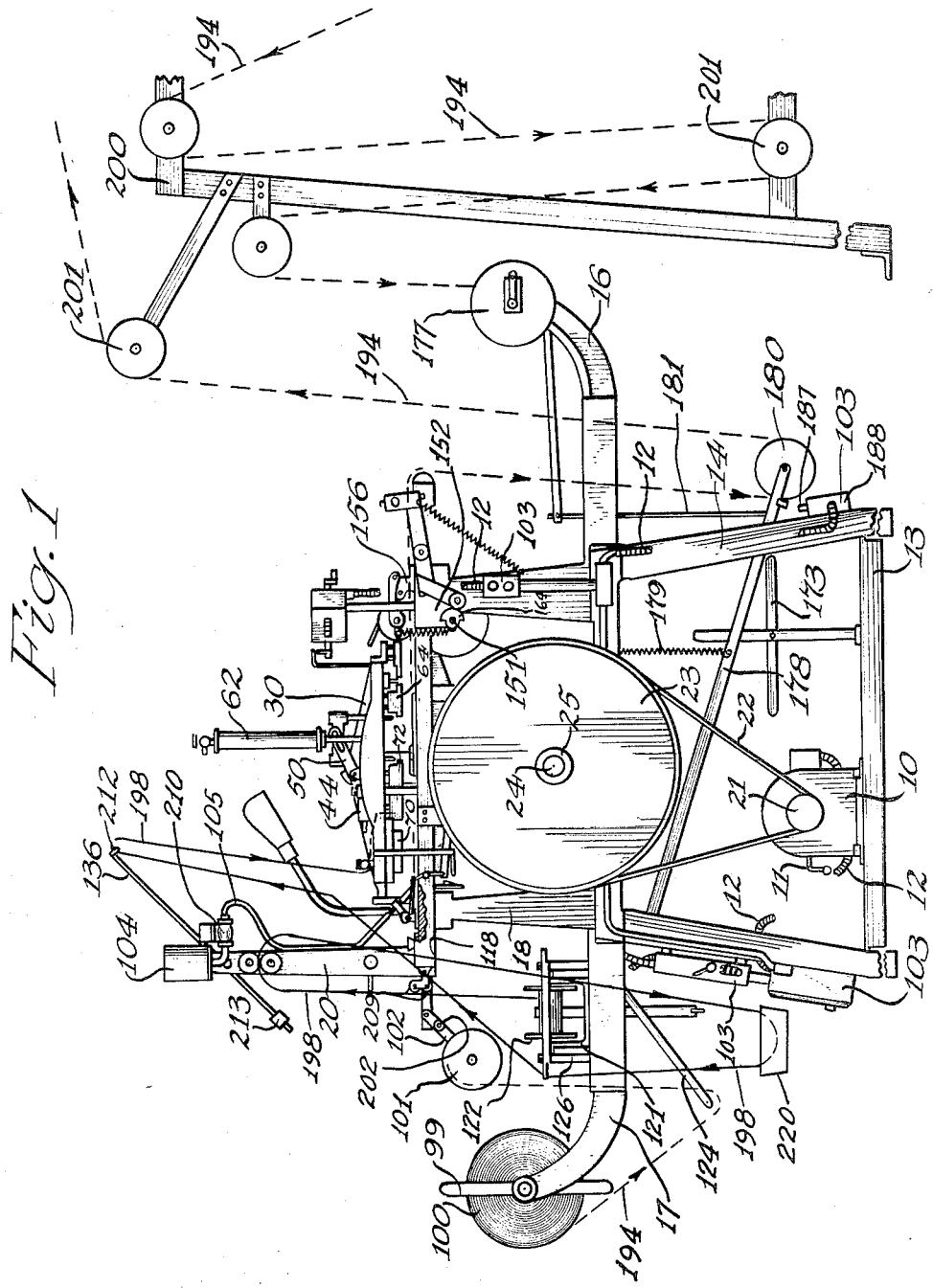
Fig. 1 is a front elevation of my device.

To properly understand my novel device it should first be understood what is manufactured and assembled by my device. Therefore attention is directed to Figs. 12, 13 and 14 which represent various views of a single segment of a parcel carrying device. My unique machine produces these segments continuously and connected together. It will be noted that numeral 194 designates an anchoring tape. At appropriately spaced intervals an elongated slit, slot or opening 195 having enlarged apertures or openings 196 at the ends of said slit is provided.

Numeral 197 designates transverse slots, perforations or openings which facilitate the separation of various segments of the finished product which is usually rolled. Numeral 198 represents a carrying cord or ribbon which extends through the slit 195 and which provides a suitable carrying cord or ribbon. Numeral 199 designates segments, reinforcing strips or tapes which are adjacent the openings 196 and which are adapted to prevent the body anchoring tape from tearing because of the force applied when the parcel carrier is employed. Observe that on the underneath or bottom side the ribbon 198, shown in Fig. 14, is connected, preferably adhered, to the glue-coated under surface of anchoring tape 194.

Referring now to my novel and unique device it will be noted that numeral 14 designates a suitable frame or standard having a base 13 which may be integral with the standard. Numeral 10, illustrated in Figs. 1 and 2, designates a preferably variable speed motor housing mounted on the base. Numeral 11 represents a hand lever which is adapted to cause changing of the speed of the motor in the housing 10. Numeral 103 generally designates certain switch mechanism housings for properly actuating the motor in the housing 10. Numeral 12 designates the conduits carrying the electrical circuit wires and connecting the various portions of my device as will hereinafter become more apparent.

The standard 14 carries a table surface 15 which is illustrated in Figs. 1, 2 and 3. Extending outwardly from the table 15 and to the right is an upwardly curved preferably slotted arm 16 which is illustrated in Figs. 1 and 2. Numeral 17 represents an upwardly extending arm extending to the left of table surface 15. Arms 16 and 17 may be integral with the frame or suitably connected thereto. Numeral 18, illustrated in Figs. 1, 2 and 3, represents a standard which is suitably secured on the plate or table 15 and which provides a flat tablelike surface 19, over the top of which the assembled parcel carrying tape will be drawn. A suitably upwardly extending frame comprising a pair of arms 20 is suitably secured to or made integral with the table top 19. Numeral 21 designates a pulley wheel which is mounted on the drive shaft of motor 10 and by means of drive belts 22, illustrated in Figs. 1, 2 and 3, drives pulley wheel 23. Wheel 23 is secured to one end of a central rotating shaft 24 and is retained from lateral movement by means of collar 25 which is secured on the shaft 24, said shaft 24 being journalled in a suitable bearing bracket 28, the legs of which are suitably rigidly secured to the table surface 15 by means such as bolts (not shown). A pair of wheels 27 and 29 are secured on rotatable shaft 24. The innermost wheel 29 of said wheels is preferably a sprocket, said wheels or pulleys 27 and 29 being retained from outward movement by means of collar 26.

As illustrated in Figs. 1, 2 and 4, numeral 30 designates a reciprocating head which moves vertically above the top surface of table member 19. The head 30 extends outwardly to provide an apertured retaining member 31, illustrated in Figs. 2 and 3, and in which a rod, piston or arm 33 of large diameter is suitably secured. Numeral 32 designates a preferably integral boss which is preferably integral with the frame 18 and in which the piston or arm 33 is slidably mounted. As the head 30 reciprocates vertically, the piston 31 will slide within the bearing lined boss 32.

Rigidly secured on intermediate portions of the shaft 24 are a pair of eccentrics or eccentrically mounted wheels 34, each of which rotates within a collar or yoke 35. A link or lever 36 having a bifurcated end is adjustably connected to respective collars 35 by means of intermediate and adjusting screws and a vertically reciprocating arm 37 which is connected to link 36 at its bifurcated end. Numeral 38 in Fig. 4 designates one of a pair of integral bosses, integral with the table 19, and each of which is on an opposite side of the table top 19. The slidable arms or levers 37 reciprocate within the appropriately bearing lined respective bosses 38, each of said levers being secured to the reciprocating head 30 so that as the spaced yokes 35 are rocked the head 30 will move vertically upwardly and downwardly. To additionally secure the proper precision and vertical movement of head 30, I provide a pair of arms 39 and 41 which are rigidly connected to the table 19 at substantially diametrically opposite positions thereon. The arms or pistons 39 and 41 are each slidable in a pair of guides or bosses 40 and 42, respectively, which are preferably integral with the frame 18 as illustrated in Figs. 2 and 4.

Referring to Figs. 4 and 5 numeral 43 designates one of a pair of arms or posts which are transversely spaced and which are secured to the table 19 in any appropriate manner, the said posts extending through the head 30 and further facilitating the precision reciprocation of said head. A suitable apertured bracket 44 is rigidly mounted on the upper ends of posts 43. A trigger, pawl, arm or trip lever 45 extends through bracket 44 and presents an integral lug or rounded shoulder 47 extending to the right in Fig. 5. A tension spring 46 engages opposite side walls of the bracket 44 to facilitate the retention of the bracket 44 and to counter the upward force brought to bear on the shoulder or lug 47 I employ a pair of retaining nuts 48, one of which is illustrated in Fig. 5.

As illustrated in Figs. 4 and 5, numeral 49 designates an upwardly extending bracket between the arms of which a lever 50 comprising a pair of slotted arms, only one of which is shown, is pivotally connected. An upwardly extending block or plate 51 is secured to the top of arms 50 and a rearwardly extending lug or abutment member 52 is rigidly carried by the block 51. Numeral 53 represents one of a pair of upwardly extending transversely spaced arms which are rigidly secured on the head 30. Securely mounted on the upper ends of the arms 53 is an apertured plate 54. A bracket or connecting member 55, being laterally disposed, extends between the arms 53, and said bracket is provided with a pair of oppositely extending lugs or studs 56, one of which is illustrated in dotted lines in Fig. 5, which lugs are slidable in respective slots 57, only one of which is illustrated, in the arm 50. Numeral 58 designates a depending projection member including a pair of downwardly extending arms, fingers or prongs which are rigidly secured in the apertured ends of bracket 55 and which are slidable through appropriate apertures in the head 30, said arms being guided by suitably lined bosses or bearing members 59. A pair of arms 60 are carried or connected to respective arms 58 and are adapted to push the carrying ribbon 198 through the slit 195. As illustrated in Fig. 4, numeral 61 designates an arm or link or lever which extends through an aperture in plate 54, and which is rigidly secured to the upper end of the bracket 55. Numeral 62 illustrated in Figs. 1, 4 and 5 designates a hydraulic cylinder having a spring 63, illustrated in Fig. 5. It is to be understood that the upper end of the arm or link 61 acts as a plunger in the hydraulic cylinder 62, and is connected to the lower end of spring 63, said spring being attached to a portion of the housing 62 to facilitate the return movement of arm 61.

It is to be understood that as the head 30 moves downwardly the shoulders 47 and 52 will come into engagement to thereby cause the lever 50 to pivot downwardly pulling the bracket 55 and plunger 61 downwardly. When the head 30 has moved downwardly a sufficient distance to overcome the force of engagement between shoulders 47 and 52, the shoulders become disengaged and the vacuum created in the cylinder 62, coupled with the action of spring 63, draws the arm 61 upwardly thereby drawing the die 60 upwardly through the apertures 196 through which they extend to force the carrying ribbon 198 through the anchoring tape 194. The distance which the shoulder 47 extends to the right determines the length of the loop of carrying ribbon 198 which will be pushed through the anchoring tape 194.

Referring to Fig. 4, numerals 64 and 65 designate a pair of pressing blocks which engage the ribbon 198 which has been partially affixed to the normally bottom portion of the anchoring tape 194. Blocks 64 and 65 apply sufficient pressure to cause complete adhesion of the adjacent faces of the ribbon 198 and the adhered face of tape 194. Numeral 66 designates a plurality of arms which are slidably retained in the head 30 and which are connected at their lower ends to respective blocks 64 and 65. To properly cushion the engagement of the blocks 64 and 65 with the ribbon 198, I employ a number of coiled springs 67 which are positioned around respective arms 66 and which abut said blocks in the head 30. Numeral 68 designates a cutting die which is securely connected to the head 30 and which is adapted to cut the transverse slot 197, hereinabove described, in the parcel carrying device. Numeral 69 designates a block or plate which is rigidly carried by or may be made integral with the head 30. The head or block 69 carries an elongated laterally extending knife edge or die 70 which is adapted to cut the slot 195 in the anchoring tape 194. Also the block 69 carries a pair of cutting dies 71 which are adapted to cut the end apertures or openings 196. To partially affix the incoming ribbon 198, to be hereinafter described, so that the ribbon 198 will be carried along with the anchoring tape 194, I employ an elongated pressing block 72 which is carried by legs or arms 73 which are slidably mounted in the head 30 and about which are mounted soft springs represented by the numeral 74. Numeral 75 designates a pair of spring pressed arms or presses which are slidably mounted in the head 30 and which are adapted to secure the reinforcing tape 199 adjacent the end openings 196 of the slot 195.

As illustrated in Figs. 1 and 2, numeral 173 designates a bracket for supporting a pair of rolls of reinforcing tape 199. A bracket 192 having a pair of apertures (not shown) is adapted to guide the reinforcing element or tape 199. From the bracket 192 said reinforcing tapes are simultaneously led through a pair of parallel paths to be intermittently applied in the appropriate position. As illustrated in Figs. 2 and 7 I secure a mounting bracket or plate 76 to the rear end of the table 19. Extending upwardly and preferably integral with the plate 76 is an arm 77, illustrated in Figs. 7 and 8. A transversely extending arm or bracket 78 having a bifurcated or recessed end is pivotally connected to the arm 77 as illustrated. Numeral 79, illustrated in Fig. 8, designates a lever extension extending outwardly from the head 30. Numeral 80 designates a pair of adjustable screws which are adjustably mounted in the arm 78 and each of which is adapted to engage a lug 79. It will be understood that by proper adjustment of the screws 80 and by appropriate selection of said screws for abutment with the element 79, the length of the stroke of the arm 78 will be affected with a consequent result in the length of the arm 82 which is pivotally connected in the bifurcation or recess of lever 78, it being understood that the upward movement of the head 30 causes the arm 78 to pivot counterclockwise with respect to the view of Fig. 8. In order to return the arm 78 to its original position, I employ a coil spring 81 which is connected to the end of the arm 78 and to a portion of the frame.

As illustrated in Figs. 7 and 8, numeral 83 represents a ratchet or clutch housing having an outwardly extending extension. Numeral 89 designates an apertured plate which is connected to housing 83 by means of connecting member or link or pin 205 to which the lower end of link or lever 82 is secured. Mounted within the ratchet housing is a ratchet 84 and a pivotally mounted dog or pawl 88 which is adapted to permit the rotation of the ratchet only clockwise with respect to the view of Fig. 8. Numeral 85 designates a shaft to which the ratchet 84 is secured.

A journalling bracket 86 provides the means for journalling one end of the shaft 85. A pair of upwardly extending journalling arms or blocks 87 preferably integral with mounting plate 76 provides additional means for journalling the shaft 85. A second shaft 92 vertically spaced from shaft 85 is journalled in the upwardly extending arms 87. To properly adjust the distance of the shaft 92 from the shaft 85, I employ a pair of screws 204 which adjustably engage bearing elements in the arms 87. Numeral 90 designates a pair of grooved pulley wheels having grooves 91 and which are secured to the shaft 85. Numeral 93 designates a pair of spaced contact pulleys having a peripheral flange 94 and which are secured on shaft 92. The pulleys 90 and flange 94 comprise a pair of reinforcing tape feeding mechanisms. Numeral 95 designates a pair of cooperating gears or toothed wheels which are secured on respective shafts 85 and 92.

It now will be understood that as the arm 78 rocks back and forth to rock the housing 83, the ratchet 84 will be intermittently partially rotated to thereby intermittently partially rotate the shaft 85 to subsequently intermittently feed the reinforcing tape 199.

Referring to Fig. 8, numeral 96 designates one of the two tracks onto which the reinforcing tape is fed from between the rollers 90 and 93. The track 96 is pivotally connected to the frame 19 and is normally kept in an an upwardly extended position by means of spring 206. Numeral 97 designates a reciprocating knife which is secured to the head 30 and which is also adapted to retain the reinforcing tape from lateral movement. Numeral 98 represents one of a pair of arms or lugs which are rigidly secured to the head 30. As the head 30 moves downwardly, lugs 98 push the forward end of the track 96 downwardly to the level of table 19 and the knife 97 cuts or severs a segment of reinforcing tape 199 which segment of tape protrudes over the edge of the track 96 and is being held down against the anchoring tape 194 by blocks 75.

Referring to Fig. 3, it will be noted that a water reservoir 118 is secured to the frame of my device. By means of a conduit 208, illustrated in Fig. 8, water is drawn by means of capillary action to a suitable applicator 207 which is mounted in the end of track 96. As the reinforcing tape 199 passes over the applicator 207, the gummed surface is wetted so that the reinforcing tape will adhere to the normally lower surface of the anchoring tape 194 as illustrated in Fig. 14.

Referring to Figs. 1 and 2, numeral 99 designates an upwardly extending bracket or arm on which the spool 100 of anchoring tape 194 is rotatably mounted. Numeral 124 designates an adustable spring supported right angle arm which is pivoted to the arm 17. A soft spring 125 which at one end is connected to the frame supports arm 124 at a point intermediate its length as illustrated in Fig. 2. The weight of arm 124 rests upon the tape 194 being unrolled from the spool 100 so that as tape 194 is intermittently stopped in the device the force of the pull on the spool 100 will be broken to thereby preclude the too rapid unraveling of the tape from the spool 100. Numeral 101 designates a reel, spool or wheel which is rotatably supported by arms or brackets 102 which are secured to an extension of the table top 19. A rotatable track or wheel 202 is rotatably mounted on arm 102 as illustrated in Fig. 1. As the tape 194 is unwound in a clockwise direction with respect to Fig. 1 it passes under the transverse extension on the arm 124 and up over the roller 101 over the roller 202 and onto the table 19 to cooperating rollers 209 which are illustrated in Fig. 1. To keep the anchoring tape 194 from piling up during the intermittent stopping of said tape in the device, I have found it useful to provide a weight or friction element 203 over the tape 194 as illustrated in Fig. 3.

It is to be understood that the anchoring or gummed surface of anchoring tape 194 passes over the surface of table 19 with the gummed face up. In order to affix the carrying ribbon to the gummed face as illustrated in the bottom view, Fig. 14, it is necessary to apply a suitable material such as water to facilitate said adhesion. To do this, I have provided a novel combination of elements as follows: Referring to Figs. 1, 2 and 3, numeral 104 designates a water reservoir which is suitably connected and supported on the frame work of my device. Numeral 105 designates a conduit which is adapted to carry the water from the reservoir to the aplicator 106 which is illustrated in Fig. 11 and which is positioned above the table 19 near its left end and which is adapted to intermittently engage the moving tape 194 so that a line of moisture is applied to the gummed surface of tape 194. Interposed in the conduit 105 is a solenoid operated valve 210 which is illustrated in Fig. 1. The valve 210 is adapted to halt the flow of liquid from reservoir 104 over the surface of the table top 19. This of course precludes the flooding of the table while my novel device is temporarily inoperative. Referring to Fig. 11, it will be seen that numeral 107 designates an upwardly extending bracket which is secured to the table 19 and which has a pair of upwardly extending arms in which is mounted a pintle or shaft 108. A pivotal element or cylinder 109 is secured to the pin 108. Said cylinder 109 carries an arm 110 which is secured to a rigid portion of the conduit 105. It is to be understood that it is preferable to make portions of the conduit between the reservoir 104 and the arm 110 flexible so that the rocking movement of the arm 110 will be facilitated. An elongated lever 111 is secured to the cylinder 109 and at a portion thereof said lever or arm 111 is in engagement with arm 112 which is pivoted or fulcrumed to the frame as illustrated in Fig. 11. It will be seen therefore that as the arm 112 rocks the applicator 106 will intermittently engage the anchoring tape 194, it being understood that the arm 112 will be rocked from engagement with the arm 111 when the applicator is applying moisture to one face of the tape 194, the applicator having been carried into engagement with the tape 194 by virtue of the gravity pull. Lever 112 is secured to an elongated lever 113 which is illustrated in Figs. 3 and 11.

Referring to Fig. 3, a cam or cam-faced wheel 114 is secured to the shaft 24. A lever designated as 115 is operatively connected to the cam 114 so that the lever 115 reciprocates as the cam 114 rotates. Numeral 116 designates a link or arm which operatively connects lever 113 to the reciprocating arm or lever 115 which reciprocates within the housing 117 which is carried by the bracket 28. It is to be understood that the arm 113 is preferably pivoted to the frame of my device and that it rocks back and forth to effect the proper movement of the arm 112 by virtue of connection therewith as illustrated in Fig. 11.

Referring to Figs. 3 and 9, numeral 119 designates an apertured rung which is secured between the upwardly extending arms of the bracket 20, said rung having an aperture or eyelet 120. Referring to Fig. 2, numeral 121 designates a bracket comprising a pair of upwardly extending arms and being secured on the arm or extension 17. Numeral 122 designates a spool or reel which is rotatably mounted between the arms of the brackets 121 and on which is releasably carried the ribbon 198. Numeral 126, illustrated in Fig. 1, designates a bracket having a plurality of rungs through which the ribbon 198 extends as it is unwound from the spool 122 and which is adapted to partially compensate for the intermittent pull on the ribbon so that the continuously unwound ribbon from the spool 122 will not pile up and tangle. To additionally deter the ribbon 198 from unrolling from reel 122 too rapidly, I employ a friction strap 123 which lays over and is in frictional engagement with the ribbon 198 on the spool 122. The ribbon or cord 198 extends from the bracket 126 through the eyelet 120 in the rung 119. Numeral 127, illustrated in Fig. 9, designates a rung or arm which is mounted between the upwardly extending arms of member 20. The rung 127 preferably has an aperture which is not shown and through which the ribbon 198 extends from the eyelet 120. Numerals 128 and 129 designate a pair of shafts which are journalled in the upwardly extending arms of the frame 20. Cooperating feed rollers 130 and 132 are secured on shafts 128 and 129, respectively, roller 130 being provided with an annular groove 131 and roller 132 being provided with an annular cooperating flange 133 which rides in the groove 131 over the ribbon 198 as it is being fed through the slot or eye (not shown) in the rung 127. Numerals 134 represent a pair of cooperating gears or toothed wheels which are secured on the shafts 128 and 129, respectively. It will be noted that shaft 129 extends outwardly from the upwardly extending frame 20 and that a pulley or grooved wheel 135 is securely mounted on the outer extension of said shaft. Numeral 136 designates an extensible and rockable arm which is pivoted to a supporting rung 211 of the frame 20. At its right end arm 136 has an eyelet or aperture 212 illustrated in Figs. 1 and 2, and at its left end arm 136 is weighted with a suitable weight 213.

As the ribbon 198 is fed between the cooperating rollers 130 and 132, it is extended through a circuitous path so that a continuous flow of ribbon is available to the assembling operation. The length of the path through which the ribbon 198 extends is adapted to compensate for the intermittent requirement of same during the assembling operation. Prior to feeding the ribbon 198 into the assembling operation through the elements illustrated in Fig. 10, the ribbon is passed through the eyelet 212. In order to continuously draw the ribbon 198 and at a proper speed a pulley wheel 137, illustrated in Fig. 3, is secured on the shaft 24 and by means of a belt (not shown) the wheel or pulley 135 is driven because of the rotation of the pulley 137.

As illustrated in Fig. 10, the ribbon 198 is drawn through a slotted bracket, track or plate 138 having an upwardly extending bar or arm 139. Extending through the arm 139 is a pin 140 having an adjusting head or cap 141. The pin 140 has secured thereto a tension spring 143, said spring being adapted to apply an adjustable tension or pressure on the ribbon 198 which is being pulled into the assembly of the parcel carrying cord. A set screw 142 extends through the arm 139 and engages the pin 140. By proper adjustment of the cap 141 the tension caused by the spring 143 on the ribbon 198 may be adjusted as desired. The amount of ribbon which is pulled into the assembly must be exactly predetermined in order to avoid excesses so that the assembling operation may continue unimpaired. Therefore, I have found it necessary to machine the surface of the head 30 as indicated at 144 to obtain a perfectly flat surface for an apertured mounting block 145 which is appropriately secured to the machined surface 144 of the head 30. Numeral 146 designates a plate. An end of the bracket 138 is interposed between the block 145 and plate 146 so that bracket 138 is properly retained in position on the head 30 by means of screws 147. The ribbon 198 extends through a slot in the plate 146 and from there it extends through a guide or apertured plate 148 which is mounted over an aperture in the head 30 through which the ribbon 198 extends to enter the assembling operation at the left of the pressing block 72.

Referring to Fig. 2, numeral 149 designates a sprocket which is driven by means of a sprocket chain 150 from the sprocket 29 mounted on the shaft 24. Numeral 190 designates an adjustably mounted sprocket carried on adjustably mounted arm 191 which is adapted to adjust the tension on chain 150, arm 191 being adjustably mounted on the frame of my device as illustrated in Fig. 2. Numeral 151 designates a pin or shaft on which the sprocket 149 is securely mounted. Numeral 152, illustrated in Figs. 1 and 6, designates one of the two spaced journalling members which are secured to the frame of my device and in which the pin 151 is journalled. Numeral 153, illustrated in Fig. 2, designates a gear which is carried on the shaft 151 and which is spaced inwardly from the sprocket 149. Numeral 154 designates a cooperating gear which is driven by the rotation of the gear 153 and which is secured to the shaft 155. As illustrated in Figs. 1, 2 and 6, a bracket 156 is secured to the table 19. A pair of arms 157, one of which is illustrated in Fig. 6, are connected to bracket 156 by means of a pin or pintle 158 so that the arm 157 is permitted a slight amount of rocking. The ends of arms 157 are apertured and the pin or shaft 155 is journalled in said apertures. An adjusting mechanism 159 including an adjustable screw abuts against the surface of the table 19 and the arm 157 so that the height of friction wheel 163 which is secured to shaft 155 may be adjusted. Numeral 162 designates a cooperating cam, cam-faced disk or wheel which is secured on the shaft 151.

In order to maintain the wheel in proper relation to the feeder cam 162, I employ a tension spring 160 which is anchored at its upper end on a bracket 161 which is rigidly secured on the arm 157 and which is retained at its lower end by means of an extension of the plate 152.

It will be noted by referring to Figs. 1 and 6 that I secure a cam-faced wheel or cam 164 on shaft 151 in front of the journalling plate 152. A wheel 165 pivotally carried by link 167 is adapted to continuously engage the cam-faced wheel 164 as the shaft 151 rotates. Link 167 is secured to a laterally extending arm which is fulcrumed to the frame as illustrated in Fig. 6. To facilitate moving the arm 166 in a clockwise direction with respect to Fig. 6 to thereby draw the wheel 165 in engagement with the narrower portion of cam 164, I employ a spring 214 which is connected to an upwardly extending apertured lug 168 carried on the end of arm 166. A shaft 169 is adjustably secured within the limits of slot or aperture 170 in the upwardly extending extension 168 of arm 166. A friction wheel or member 171, illustrated in Fig. 2, is carried on the end of shaft 169. Numeral 172 designates a wheel or track which is journalled in the end of the table surface 19.

It is to be understood that Fig. 6 represents the mechanism responsible for pulling the anchoring tape 194 intermittently through my device and it will be appreciated that as the wheel 163 and the cam 162 come into engagement, the anchoring tape 194 having ribbon 198 affixed thereto is drawn to the right with respect to Fig. 6. It is further to be understood that the elements cooperate in such a manner that as the head or tool holder 30 comes down the tape 194 which is to be operated upon will be caused to stop moving. Inasmuch as there is a continuous pull distal to the right of Fig. 6 as will become apparent hereinafter it is necessary to stop the movement of the elements being assembled and it will be understood that the friction member 171 will frictionally retain the parcel carrying member as it comes down against the table top 19. As illustrated in Fig. 2, numeral 174 designates a drive belt which is driven by the pulley 27. Numeral 175 represents a pulley which is driven by the belt 174. Numeral 176 represents a shaft on which the pulley 175 and a spool or reel 177 are carried, said shaft being journalled in the end of the upwardly extending arm 16. The spool or reel 177 is the element upon which the finished parcel carrier is continuously rolled. Another disk or wheel 215, illustrated in Fig. 2, having a friction surface is carried on the shaft or pintle 176.

As illustrated in Figs. 1 and 2, numeral 178 designates an elongated arm which at one end thereof is pivoted to the frame 14. At a point intermediate its length, arm 178 is supported by spring 179 which at its upper end is connected to the frame of the device. Numeral 180 designates a wheel which is journalled in the end of arm 178 and under which the finished parcel carrier is extended after it passes from the right end of the table 19. It will be appreciated that as the cooperating gripping or pulling members 163 and 162 draw the tape 194 through the device a relative excess of material will be fed from the right end of the device which will cause the lever 178 to lower. When the friction member 171 engages the end of the table 19 to halt the tape going through the assembling operation the arm 178 will be caused to elevate as a result of the continuous pull which is exerted by the movement of spool 177.

From beneath the roller or wheel 180 the finished product is carried over a drying rack 200 carrying a plurality of spaced spools 201 and thereafter is continuously wound on the spool or reel 177.

Referring to Figs. 1 and 2 numeral 181 designates an upwardly extending connecting rod or link which is carried by the arm 178 and as the arm 178 is caused to move up or down as aforesaid link 181 will likewise move. A laterally extending arm 182 is securely connected to the arm 181 and is pivoted to the frame extension 16 by means of its connection with sleeve 184 which is pivotally mounted on lug 183 which extends outwardly from arm 16. Numeral 185 represents an arm which is secured to the sleeve 184 and which is adapted to intermittently engage the friction element 215 to thereby intermittently break the normal rotative speed of shaft 176 which is rotated by virtue of the engagement of the wheel 175 with the belt 174.

Numeral 186 represents a downwardly extending lug or extension which may be integral with the arm 178. Numeral 187 represents a switch lever of switch 188 which is operatively connected to the switch operating the motor in the housing 10. When the finished parcel carrying tape is broken the upwardly directed force on the roller 180 will be broken causing it to drop with the resultant engagement of lug 186 with switch lever 187 to thereby stop operation of motor 10 and render the device inoperative.

The assembling operation of the anchoring tape 194, the ribbon 198 and reinforcing tape 199 is as follows: As the anchoring tape 194 comes into position under the tool holder or head 30 the friction member 172 comes down against the table 19 to stop the tape, cam 162 and wheel 163 having been rotated out of operable relation. Simultaneously the head 30 is reciprocated downwardly so that the transverse slit 195 and the apertures or openings at the ends of said slit are cut by dies 70 and 71, respectively. Simultaneously the segments of reinforcing tape 199 which have been delivered into position over the edge of track 96 and onto the upwardly turned gummed surface of the anchoring tape 194 are pressed into position by means of pressing feet 75. Simultaneously, a portion of the ribbon 198 which is fed through an aperture of the head 30 is partially affixed against the wetted gummed surface of the anchoring tape 194, it being understood that the wetting of said tape 194 occurred at spaced intervals by virtue of the mechanism illustrated in Fig. 11. When the aforesaid operation is completed cam 162 and wheel 163 draw the tape 194 and ribbon 198 to an adjacent position to the right as the head 30 simultaneously rises, the friction member 171 simultaneously being elevated. At the next downward stroke of head 30 the operation described is repeated on the segment to the left of the operated segment and simultaneously, with regard to the partially operated segment, the ribbon 198 extending over the formed slit 195 is pushed through said slit by virtue of the described mechanism illustrated in Fig. 5 to thereby form the handle or loop of ribbon seen at the right of Fig. 12. Simultaneously the two presser feet 64 and 65 secure the ribbon priorly partially affixed by the presser foot 72 while the die 68 is cutting the transverse aperture 197.

As many changes could be made in the above construction and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a machine for uniting a gummed tape and a carrying ribbon having longitudinally spaced sections thereof extending through longitudinally spaced apart and extending slits in said tape to provide handles, comprising; a frame providing a horizontal tape-supporting surface; a head mounted above said surface; power driven means for reciprocating said head vertically to and from said surface; tape feeding means for intermittently delivering and moving the slitted gummed tape over said surface and beneath said head; and reinforcing strip feeding means for intermittently delivering transversely extending segments of a reinforcing strip to said tape adjacent the ends of the slits formed therein through which the ribbon sections extend including a lever pivotally supported on said frame, said lever being rockable about its pivoted connection to said frame by the reciprocating movement of said head, a shaft journaled in said frame, a cylindrical housing rotatably mounted on said shaft, link means interconnecting said housing and lever whereby oscillating movement is imparted to said housing by the rocking movement of said lever, a toothed ratchet secured to said shaft, a pawl pivotally connected to said housing adapted to successively engage the teeth of the ratchet and rotate the same in one direction; a first roller driven by said shaft; a second roller mounted above said first roller driven by said shaft, said rollers being adapted to frictionally engage the reinforcing strip therebetween and intermittently deliver a segment of said strip over the gummed tape during each reciprocating movement cycle of said head.

2. The machine as set forth in claim 1, in which said strip segment is conditioned for adherence to said tape after leaving said rollers and before disposition over said tape.

3. The machine as set forth in claim 1, in which track means are provided for guiding the segment over the tape, said track means being pivotally supported on said frame and pivotal between a first position wherein said track means lies in a plane disposed at an angle with respect to said surface and a second position wherein said track means is substantially level with said surface; a liquid applicator means in the end of said track means for moistening the under surface of the reinforcing strip; a knife carried by said head adapted to sever the strip segment disposed over the tape from the reinforcing strip during one-half of each reciprocating movement cycle of said head; and means on said head engageable with said track means for pivoting said track means to said second position during one-half of each reciprocating movement cycle of said head.

4. In a machine for uniting a gummed tape and a ribbon having longitudinally spaced sections thereof extending through longitudinally spaced elongated slits in said tape to provide grippable handles, comprising a table for supporting the tape and ribbon; a head mounted above table adapted to reciprocate vertically to and from said table and cut said slits in said tape; means for feeding and positioning said ribbon longitudinally of said tape and above and adjacent the substantially central portion of said tape and the spaced slits thereof; means for pushing longitudinally spaced apart sections of said ribbon through said slits of said tape including a first bracket rigidly secured to and immovable with respect to said table above said head, a second bracket secured to said head; an arm pivotally connected to said second bracket having a slotted portion at one end and a projecting shoulder at its opposite end; a bar having a pair of spaced downwardly extending prongs secured thereto, said prongs being vertically slidable through said head, said bar having a lug extending therefrom adapted to be received in the slotted portion of said arm; a member slidably carried by said first bracket, said member having a shoulder disposed below, and in vertical alignment with, the shoulder carried by said arm when said head is in a raised position just prior to the downward movement of said head whereby continued downward movement of said head causes engagement of said shoulders and pivoting of said arm to thereby slide said prongs relatively to said head and push a section of ribbon disposed beneath said prongs into a slit in said tape, said shoulder on said arm being disengageable from said shoulder on said member upon continued downward movement of said head; and spring means for urging said prongs upwardly upon disengagement of said shoulders.

5. The machine as set forth in claim 4, including a spring for urging said shoulder on said member into the path of said shoulder carried by said arm; a standard secured to said head; an upwardly extending cylinder carried by said standard; a plunger slidable in said cylinder having one end connected to said bar, said spring means being connected to the upper end wall of said cylinder, and being adapted to return said vertically movable plunger and said prongs to an upper retracted position succeeding each downward ribbon-inserting movement thereof.

6. In a machine for uniting a gummed tape and a ribbon having longitudinally spaced sections thereof extending through longitudinally spaced elongated slits in said tape to provide grippable handles, comprising a table having a relatively flat, horizontal surface for supporting the tape and ribbon; a head mounted above said surface adapted to reciprocate vertically to and from said surface and cut said slits in said tape during downward movement thereof; means for feeding and positioning said ribbon longitudinally of said tape and above and adjacent the substantially central portion of said tape and the spaced slits thereof; means for pushing longitudinally spaced apart sections of said ribbon through said slits of said tape including a post secured to said table, and extending through an aperture in said head, a bracket secured to said post above said head, a retractable pawl slidably carried by said bracket projecting horizontally in a longitudinal direction from said bracket; a lever pivotally supported by said head having an abutment lying in a vertical plane containing said pawl, said abutment being vertically spaced above said pawl when said head is in its extreme raised position with respect to said surface, the downward movement of said head causing limited engagement of said pawl and abutment to rock the end of said lever opposite said abutment to move toward said surface, a pair of prongs slidably mounted in said head and adapted to move downwardly to engage a section of ribbon lying over a slit in said tape to force the section through the tape, said lever being operatively connected to said prongs whereby the rocking movement of said lever imparts reciprocating movement to said prongs.

7. The machine as set forth in claim 6, in which a vertically extending standard is secured to said head, means supported by said standard for retarding movement of said prongs downwardly including a cylinder having a plunger slidable therein, said plunger being operatively connected to said prongs and being adapted to create a vacuum in said cylinder when said prongs move downwardly, a spring connected to said cylinder and plunger for urging said plunger upwardly, said spring and the vacuum created in said cylinder acting to raise said prongs, upon disengagement of said pawl and abutment.

8. In a machine for manufacturing a united gummed tape and a ribbon having longitudinally spaced sections thereof extending through longitudinally spaced elongated slits in said tape to provide grippable parcel carrying handles and having reinforcing segments extending transversely of and secured to said tape adjacent the ends of the slits, comprising a frame having a substantially flat, longitudinally extending surface; a power driven head supported by said frame for vertical reciprocation to and from said surface, said head having a plurality of tools secured thereto for performing various assembling and forming operations on said tape, ribbon and segments, said tools being longitudinally spaced beneath said head and engageable with the tape, ribbon, and segments when said head is in its lowered position; a first spool of tape rotatably supported by said frame; a second spool of reinforcing strip, rotatably supported by said frame; a third spool of ribbon of a width narrower than said tape supported by said frame; means for intermittently pulling said tape over said surface from said first spool, said means being capable of moving a portion of tape of a predetermined length during each reciprocation cycle of said head; means for feeding ribbon from said third spool, said means being capable of feeding ribbon to said surface over the central portion of said tape continuously at a uniform rate; means for intermittently feeding a segment adjacent each end of said slit formed in the tape disposed on the surface from said second spool; a prime mover for reciprocating said head and feeding said tape, ribbon and segments, to said surface, a source of energy for said prime mover, a fourth power driven spool for receiving the manufactured parcel carriers, a lever pivotally mounted on said frame, switch means for establishing or disestablishing the flow of energy from said power source to said prime mover, said switch means being actuated by one end of said lever, the moving parcel carriers received by said fourth spool normally supporting the opposite end of said lever to actuate said switch means to establish energy flow between said energy source and prime mover, the breaking of said tape being adapted to cause said lever to rock to a position to deenergize said prime mover.

9. In a machine for manufacturing a united gummed tape and a ribbon having longitudinally spaced sections thereof extending through longitudinally spaced elongated slits in said tape to provide grippable parcel carrying handles and having reinforcing segments extending transversely of and secured to said tape adjacent the ends of the slits, comprising a frame having a substantially flat, longitudinally extending surface; a power driven head supported by said frame for vertical reciprocation to and from said surface, said head having a plurality of tools secured thereto for performing various assembling and forming operations on said tape, ribbon and segments, said tools being longitudinally spaced beneath said head and engageable with the tape, ribbon, and segments when said head is in its lowered position; a first spool of tape rotatably supported by said frame; a second spool of reinforcing strip, rotatably supported by said frame; a third spool of ribbon of a width narrower than said tape supported by said frame; means for intermittently pulling said tape over said surface from said first spool, said means being capable of moving a portion of tape of a predetermined length during each reciprocation cycle of said head; means for feeding ribbon from said third spool, said means being capable of feeding ribbon to said surface over the central portion of said tape continuously at a uniform rate; means for intermittently feeding a segment adjacent each end of said slit formed in the tape disposed on the surface from said second spool, said means for intermitently feeding a segment adjacent each end of each slit formed in the portion of tape disposed on the surface, including a mechanism engageable by said head during its reciprocating movement, said mechanism including a lever pivotally supported by said frame.

10. In a machine for uniting a gummed tape and a ribbon, said ribbon having longitudinally spaced sections thereof extending through longitudinally spaced elongated slits in said tape to provide grippable parcel carrying handles, comprising a frame supporting a table over which the tape and ribbon are fed to be operated on; means for feeding tape across said table; means for moistening longitudinally spaced sections of the gummed face of said tape including a plurality of interconnected links, a liquid applicator pivotally connected to said frame and said links and being adapted to rock into a position to engage the gummed face of said tape as the tape moves across said table, and means engageable by said links for imparting intermittent rocking of said applicator to said tape engaging position, said means including a rotatable cam; means for feeding the ribbon continuously over said gummed face of said tape; and means for pressing sections of said ribbon on said moistened sections causing adhesion of said ribbon to said moistened sections.

11. The machine as set forth in claim 10 in which a water reservoir is provided for supplying water to said applicator and control means for interrupting the flow of water from said reservoir to said applicator when the normal feeding or speed movement of the tape across said table is interrupted.

12. The combination as set forth in claim 11 in which power driven spool means are provided for continually winding the united gummed tape and ribbon received from said table; said control means comprising a solenoid operated valve in the path of water flow from said reservoir to said applicator; a switch mounted on said frame and being electrically connected to the solenoid and being adapted to close said valve when in a particular position; a lever pivotally supported by said frame having one end thereof engaging the united tape and ribbon as it leaves said table, the opposite end of said lever being movable to engage said switch to actuate the same to said valve closing position upon the breaking of the united tape and ribbon.

References Cited in the file of this patent

UNITED STATES PATENTS

| | | |
|---|---|---|
| 933,918 | Oehring | Apr. 5, 1910 |
| 954,751 | Mann | Apr. 12, 1910 |
| 1,235,805 | Jennings | Aug. 17, 1917 |
| 1,411,789 | Kellogg | Apr. 4, 1922 |
| 1,599,573 | McElroy | Sept. 14, 1926 |
| 1,637,658 | Rose | Aug. 2, 1927 |
| 1,675,980 | Lebherz | July 3, 1928 |
| 1,696,638 | Kallenbaugh | Dec. 25, 1928 |
| 1,714,143 | Schramm | May 21, 1929 |
| 1,790,559 | Swift | Jan. 27, 1931 |
| 1,849,143 | Granger | Mar. 15, 1932 |
| 1,968,166 | Phythian | July 31, 1934 |
| 2,095,139 | Kind | Oct. 5, 1937 |
| 2,137,913 | Kind | Nov. 22, 1938 |
| 2,164,935 | Meyer | July 4, 1939 |
| 2,225,515 | Wood | Dec. 17, 1940 |
| 2,292,511 | Ferm | Aug. 11, 1942 |
| 2,293,433 | Gautier | Aug. 18, 1942 |
| 2,319,476 | Ray | May 18, 1943 |
| 2,351,397 | Buchet | June 13, 1944 |
| 2,521,691 | Corlett | Sept. 12, 1950 |

FOREIGN PATENTS

| | | |
|---|---|---|
| 437,881 | Great Britain | Nov. 6, 1935 |
| 849,963 | France | Aug. 28, 1939 |